(12) United States Patent
Wang

(10) Patent No.: US 12,209,954 B2
(45) Date of Patent: Jan. 28, 2025

(54) MULTI-CAPILLARY OPTICAL DETECTION SYSTEM

(71) Applicant: Life Technologies Corporation, Carlsbad, CA (US)

(72) Inventor: Shaohong Wang, Pleasanton, CA (US)

(73) Assignee: Life Technologies Corporation, Carlsbad, CA (US)

(*) Notice: Subject to any disclaimer, the term of this patent is extended or adjusted under 35 U.S.C. 154(b) by 310 days.

(21) Appl. No.: 17/633,170

(22) PCT Filed: Aug. 6, 2020

(86) PCT No.: PCT/US2020/045288
§ 371 (c)(1),
(2) Date: Feb. 4, 2022

(87) PCT Pub. No.: WO2021/071572
PCT Pub. Date: Apr. 15, 2021

(65) Prior Publication Data
US 2022/0334055 A1  Oct. 20, 2022

Related U.S. Application Data

(60) Provisional application No. 62/884,070, filed on Aug. 7, 2019.

(51) Int. Cl.
*G01N 21/33* (2006.01)
*G01N 21/64* (2006.01)
*G01N 27/447* (2006.01)

(52) U.S. Cl.
CPC ......... *G01N 21/33* (2013.01); *G01N 21/6452* (2013.01); *G01N 27/44721* (2013.01);
(Continued)

(58) Field of Classification Search
CPC ............... G01N 21/33; G01N 21/6452; G01N 27/44721; G01N 2021/6484; G01N 2021/6491
See application file for complete search history.

(56) References Cited

U.S. PATENT DOCUMENTS 4,927,265 A  5/1990  Brownlee
2003/0226756 A1  12/2003  Inaba et al.
(Continued)

FOREIGN PATENT DOCUMENTS

CN  103649726 A  3/2014
CN  104181133 A  12/2014
(Continued)

OTHER PUBLICATIONS

International Search Report and Written Opinion, dated Sep. 1, 2021, for International Application No. PCT/US2020/045288, 12 pages.
(Continued)

*Primary Examiner* — Mark R Gaworecki

(57) ABSTRACT

An optical detection system for a capillary electrophoresis instrument is disclosed. The optical detection system comprises an ultraviolet (UV) source and an absorption measurement optical path. The optical path comprises a first plurality of optical elements comprising a first optical fiber array and other elements. The first plurality of optical elements are arranged to obtain a plurality of respective UV beamlets from a UV beam emitted by the UV source and to direct, at least partially using the first optical fiber array, the respective UV beamlets through respective capillaries of a plurality of capillaries and to an absorption detector positioned to detect respective signals for use in obtaining respective UV absorption measurements corresponding to the respective capillaries.

21 Claims, 8 Drawing Sheets

(52) U.S. Cl.
CPC .............. *G01N 2021/6484* (2013.01); *G01N 2021/6491* (2013.01)

(56)        References Cited

U.S. PATENT DOCUMENTS

2009/0255814 A1    10/2009   Yamazaki et al.
2017/0016853 A1     1/2017   Maher

FOREIGN PATENT DOCUMENTS

| CN | 105973859 A | 9/2016 | |
|---|---|---|---|
| CN | 106018403 A | 10/2016 | |
| CN | 106164665 A | 11/2016 | |
| CN | 208701067 U | 4/2019 | |
| WO | WO-9961894 A1 * | 12/1999 | ........... G01N 21/253 |
| WO | 2002/093144 A1 | 11/2002 | |
| WO | 2007/137273 A2 | 11/2007 | |
| WO | WO-2015134925 A1 | 9/2015 | |
| WO | WO-2018156969 A1 | 8/2018 | |
| WO | 2020/190969 A1 | 9/2020 | |

OTHER PUBLICATIONS

Calavska, J et al (Aug. 11, 1995) "Modification of a tunable UV-visible capillary electrophoresis detector for simultaneous absorbance and fluorescence detection: profiling of body fluids for drugs and endogenous compounds" Journal of Chromatography A. 709 (1995) 147-156, 10 pages.

* cited by examiner

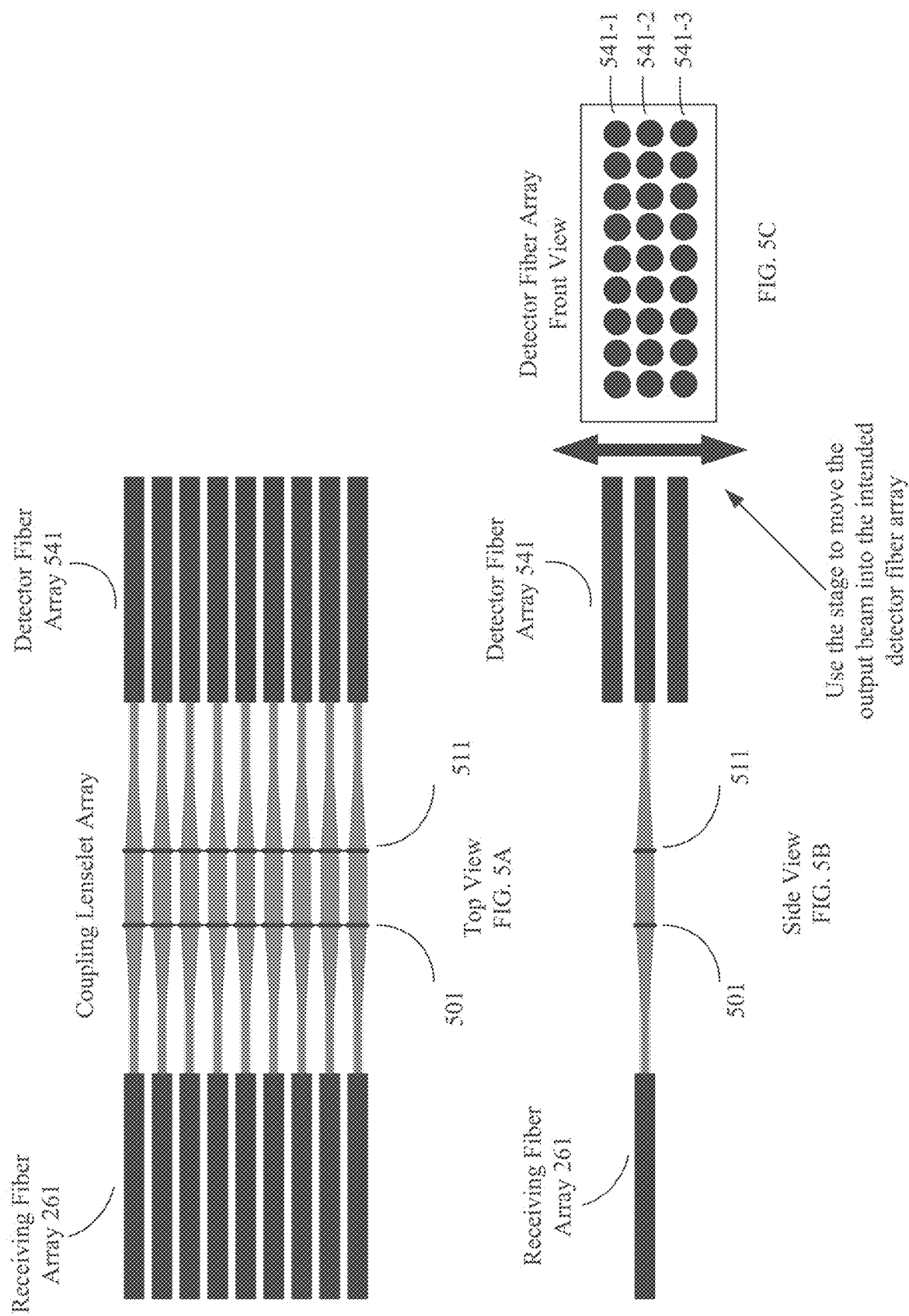

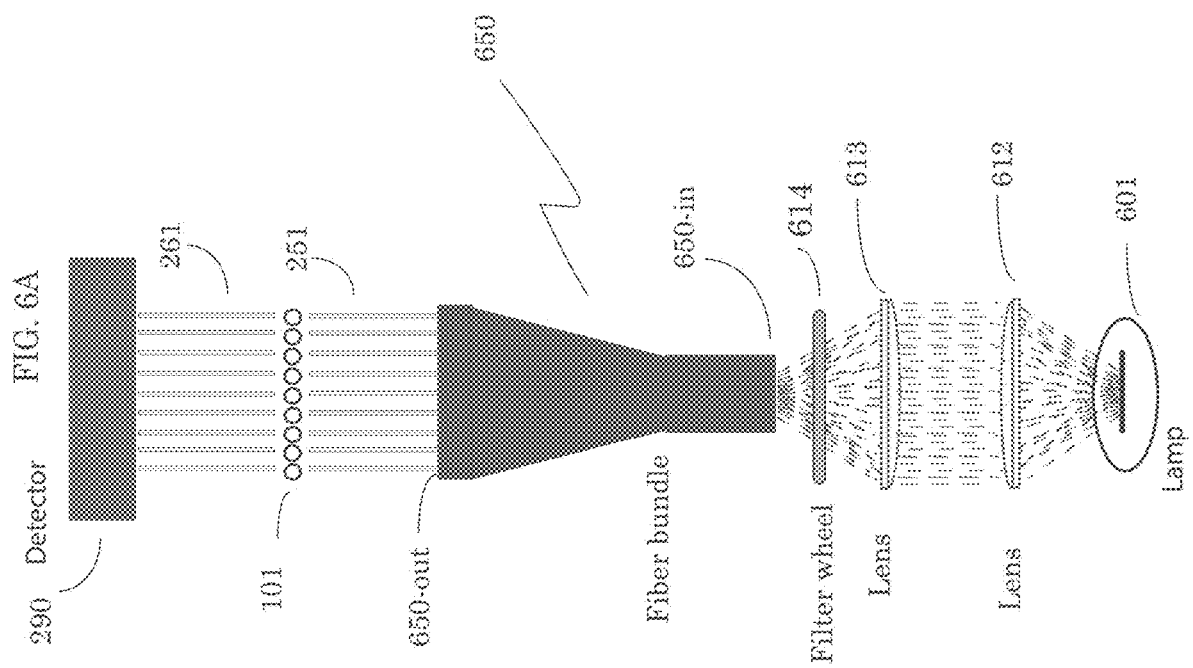
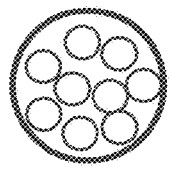
FIG. 6A
FIG. 6B
650
(cross sectional bottom view at 650-in)
FIG. 6C
650
(cross sectional bottom view at 650-out)

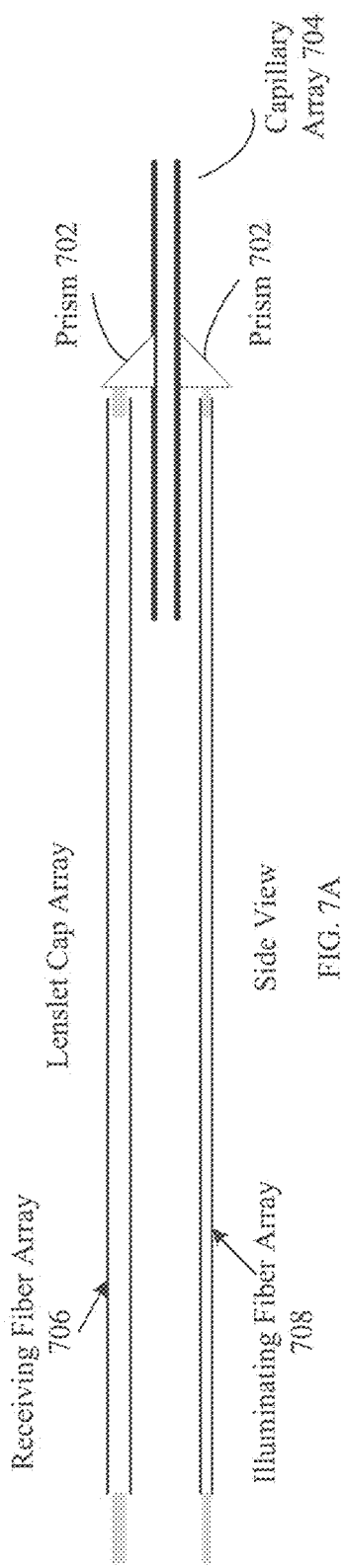
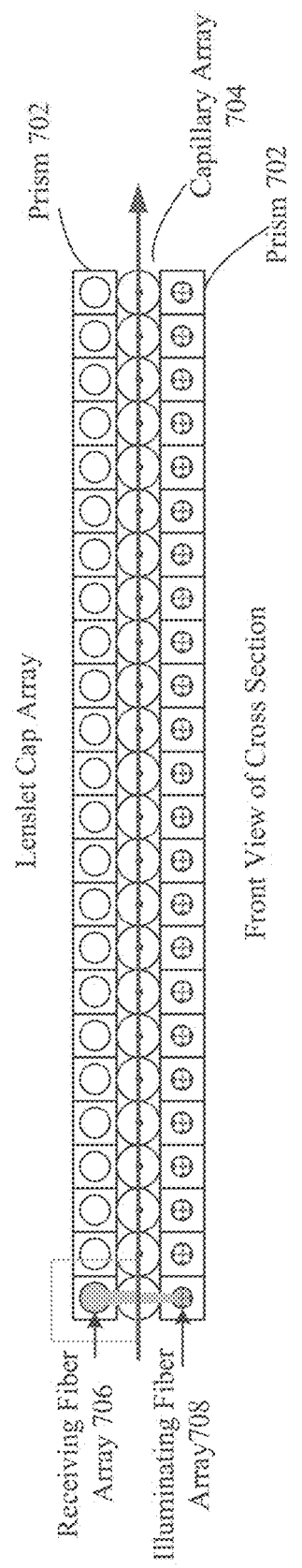
FIG. 7A Side View
FIG. 7B Front View of Cross Section

MULTI-CAPILLARY OPTICAL DETECTION SYSTEM

CROSS-REFERENCE TO RELATED APPLICATIONS

This application is a U.S. National Phase application under 35 U.S.C. § 371 of International Application No. PCT/US2020/045288 filed on Aug. 6, 2020, which claims priority to U.S. Provisional Application Ser. No. 62/884,070, filed on Aug. 7, 2019, entitled "MULTI-CAPILLARY OPTICAL DETECTION SYSTEM" and is related to U.S. Provisional Application Ser. No. 62/820,222, filed on Mar. 18, 2019, entitled "MULTI-CAPILLARY OPTICAL DETECTION SYSTEM." The content of these applications are incorporated herein by reference in its-their entirety for all purposes.

BACKGROUND

This disclosure relates generally to optical detection systems for capillary electrophoresis instruments. Existing capillary electrophoresis instruments analyze samples using visible light or other electromagnetic sources to excite and measure fluorescence of a sample-filled capillary. Certain other capillary electrophoresis instruments analyze samples using ultraviolet (UV) sources to measure absorption of UV radiation by a sample-filled capillary.

SUMMARY

There is an increasing need for a high-throughput and high-quality capillary electrophoresis (CE) analysis platform. One way to efficiently increase throughput is by conducting measurements across a plurality of capillaries simultaneously. However, in the context of ultraviolet (UV) absorption measurements, prior methods have not achieved such measurement efficiently. Some embodiments of the present invention provide a multi-capillary CE optical detection system that efficiently provides UV absorption measurements across a plurality of capillaries using one or two UV sources. For certain types of samples, e.g., proteins, combining multiple types of electromagnetic measurements in a single system would be especially useful. Some embodiments provide multiple types of measurements in a single system. In one embodiment, optical paths allow using two different UV sources to measure UV absorption at different wavelengths. In another embodiment, optical paths allow using an additional UV source to simultaneously measure UV fluorescence. Some embodiments also include an optical path for using a visible light source to excite and measure fluorescence. In some embodiments, point sources are used and a digital signal processing unit utilizes signals from a reference capillary to remove source and capillary noise from signals corresponding to sample-filled capillaries. In some embodiments, the system is particularly applicable to measuring protein samples. In some embodiments, the system is applicable to other types of samples. These and other embodiments and variations thereof are more fully described below.

Various other aspects of the inventive subject matter will become more apparent from the following description, along with the accompanying drawings.

BRIEF DESCRIPTION OF THE DRAWINGS

FIGS. 5A-5C illustrate certain additional details regarding optical elements for serial light detection in the optical detection system embodiment of FIG. 2.

FIG. 6A illustrates an alternative embodiment of a portion of the optical detection system of FIG. 1.

FIGS. 6B-6C illustrates certain additional details regarding an exemplary fiber bundle of the embodiment of FIG. 6A.

FIGS. 7A and 7B illustrate certain additional details regarding using prisms to direct UV light for absorption measurements through a capillary array as an alternative embodiment to the optical detection system embodiment of FIG. 2.

FIG. 8 also illustrates signals output by the digital signal processing unit.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Figure 1:
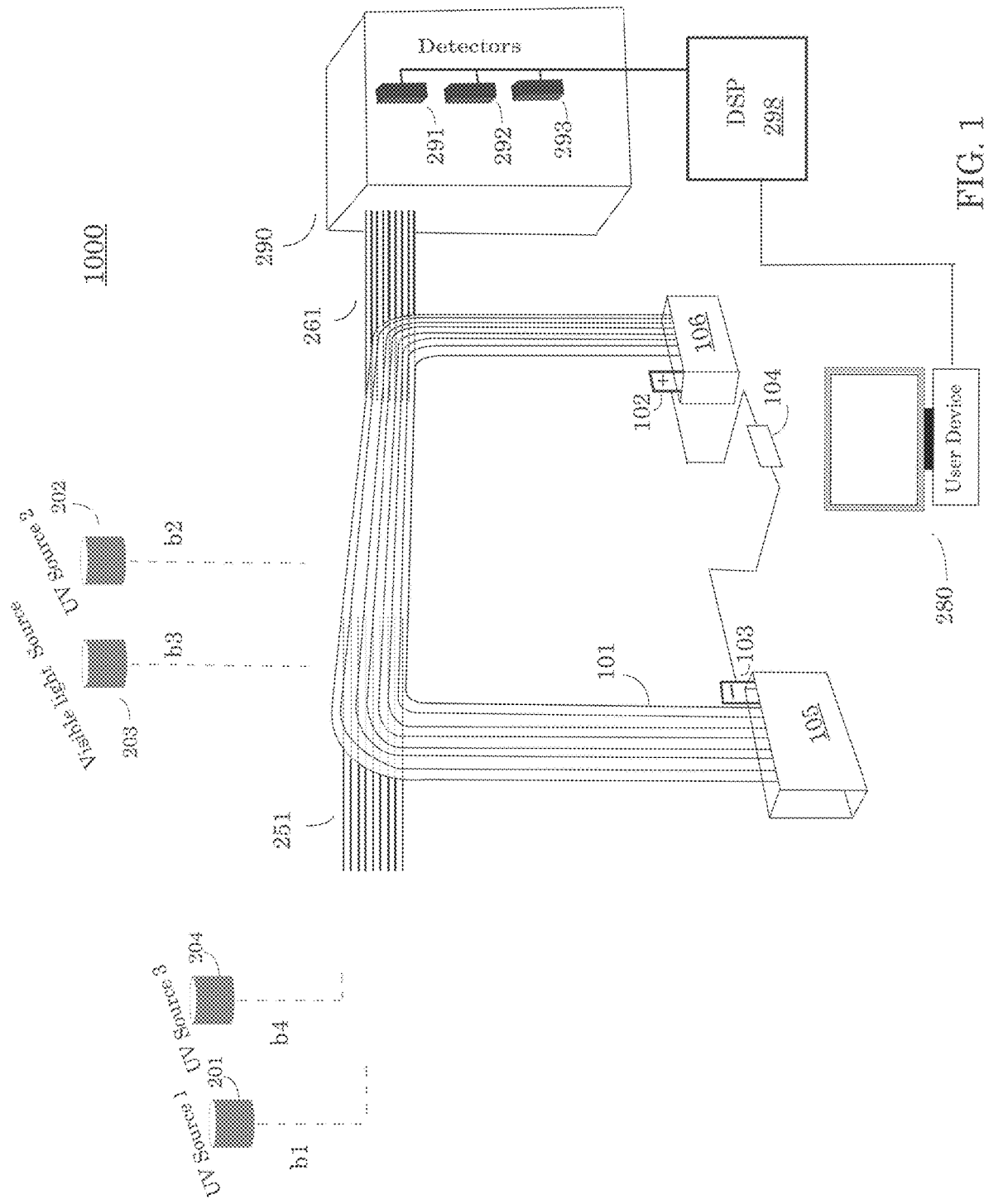
FIG. 1 is a high-level diagram illustrating portions of a sample separation and identification instrument including an optical detection system in accordance with one embodiment of the present invention.

FIG. 1 is a high-level diagram illustrating portions of a sample separation and identification instrument 1000 including an optical detection system in accordance with one embodiment of the present invention. In the illustrated embodiment, instrument 1000 is a capillary electrophoresis (CE) instrument comprising at least one capillary 101 having an outer capillary diameter and an inner capillary channel diameter of a capillary channel through which a sample or other liquid may flow.

Figure 2:
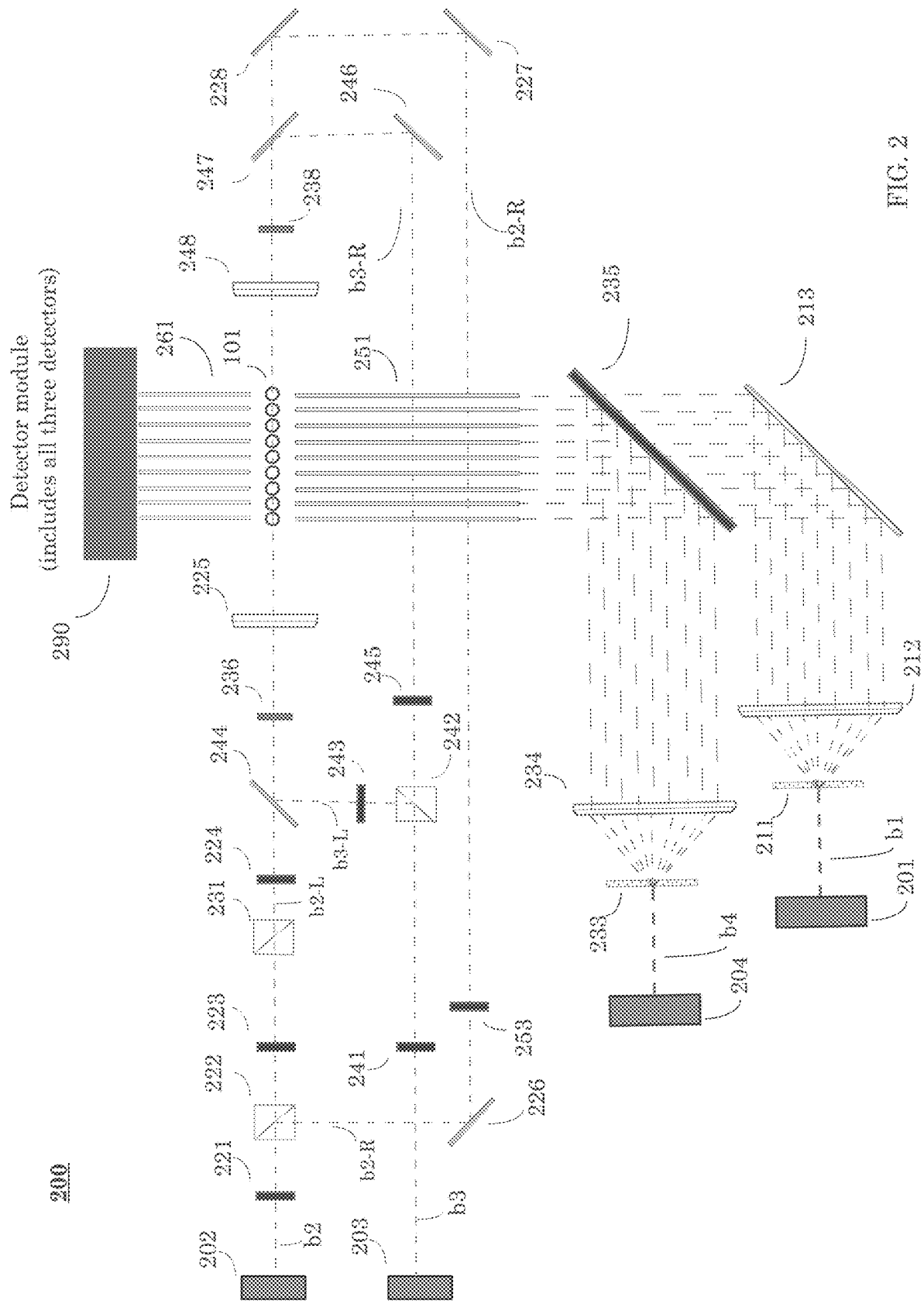
FIG. 2 illustrates an embodiment of the optical detection system of the embodiment of FIG. 1.

With additional reference to FIG. 2, instrument 1000 comprises an optical detection system 200 comprising sources 201, 202, 203, and 204. As used herein, unless otherwise indicated or implied, "source" refers to a source of electromagnetic radiation, for example, a source of ultraviolet (UV) radiation, visible light, near-infrared, and/or infrared radiation. The terms "UV source" and "UV light source" will be used interchangeably herein to mean a source producing radiation primarily or exclusively within UV band of the electromagnetic spectrum, e.g., from about 10 nanometers ("nm") to 400 nm. As used herein the term "visible light source" means a source producing radiation primarily or exclusively within visible light band of the electromagnetic spectrum (e.g., from about 380 nm to 740 nm).

In the illustrated embodiment, source 201 comprises a first UV source providing UV beam b1 having a first wavelength or wavelength band and source 204 comprises a second UV source providing UV beam b4 having a second wavelength or wavelength band. Source 203 comprises a visible light source providing visible light beam b3. Source 202 comprises a third UV source providing UV beam b2 having wavelength or wavelength band that may be the same or different than that of either beam b1 or b4. In one embodiment, beam b1 has a nominal or peak output at a wavelength that is at or near 220 nm and beam b4 has a nominal or peak output at a wavelength that is at or near 280 nm. Beam b2 may have a nominal or peak output at a wavelength that is different from or the same as that of beam b1 and/or beam b4. In alternative embodiments, these wavelengths might be different without departing from the spirit and scope of the invention. In a preferred embodiment, UV sources 201, 202, and 204 each comprise a UV laser or similar UV source. In certain alternative embodiments, sources 201, 202, and 204 may comprise a deuterium lamp, a UV light emitting diode (LED), or the like.

In one embodiment, sources 201, 202, and/or 204 may be configured to provide a UV light that can be focused to provide a beam or spot at or near each capillary 101 having a diameter that is equal or approximately equal to an inner capillary diameter, preferably a diameter at or near the capillary that is less than the inner capillary diameter. It has been found that transmittance or absorption measurements can be made with better sensitivity with the use of a smaller beam/spot diameter at or near the capillary because, for example, a higher percentage of the beam is impacted by variations in transmittance or absorption of the sample, sample solution or other substance flowing through the inner capillary channel.

In a preferred embodiment, sources 201, 202, 203 and/or 204 are point sources. As used herein, the term "point source" refers to a source that produces a beam that can be focused to a spot (cross-section or slice of the beam at a particular location) at or near a capillary having a beam diameter that is less than or equal to the diameter of an inner channel of the capillary. As used herein, in the case of a source producing a beam having, or characterized by, a Gaussian shape (e.g., a laser source), the term "beam diameter" means the $1/e^2$ diameter of the beam at a particular location along the beam's optical path (e.g., at capillary 101). As used herein, in the case of a source producing a beam not having, or not characterized by, a Gaussian shape, the term "beam diameter" means a diameter of the smallest circle or aperture containing 85% of the energy or power in a cross-section of the beam at a particular location in the beam's optical path (e.g., at a capillary 101).

Source 203 comprises a visible light source providing visible light beam b3, for example, light having a nominal or peak output at a wavelength at or near 505 nm or some other wavelength within the visible light range. In some embodiments, source 203 is a visible broadband light source or a white light source. In certain embodiments, source 203 and beam b3 may further comprise at least some radiation in the UV and/or infrared wavelength band ranges. Source 203 and beam b3 may comprise a range of wavelengths, for example, a wavelength range suitable for exciting a plurality of dyes excited at different wavelengths (e.g., a wavelength range over all or part of the visible light wavelength range or a wavelength range also including radiation in the infrared and/or ultraviolet wavelength band). In certain embodiments, source 203 may comprise electromagnetic radiation in visible band, as well as in the ultraviolet, infrared, and/or near-infrared with sufficient energy to excite dyes sensitive to radiation in each of these ranges. Source 203 may comprise one or more of an incandescent lamp, a gas discharge lamp (e.g., Halogen lamp, Xenon lamp, Argon lamp, Krypton lamp, etc.), a light emitting diode (LED), a white light LED, an organic LED (OLED), a laser (e.g., chemical laser, excimer laser, semiconductor laser, solid state laser, Helium Neon laser, Argon laser, dye laser, diode laser, diode pumped laser, fiber laser, pulsed laser, continuous laser), or the like.

Simultaneous illumination of multiple capillaries for UV transmittance or absorption measurements at the same UV wavelength has previously required the use of multiple UV sources such as a deuterium lamp, for example, in combination with a plurality of optical fibers located in front of a plurality of corresponding capillaries. There are various reasons for this. A typical deuterium lamp used in the art for UV absorption measurements in the CE context is very stable (low noise), but has limited power. In a multiple capillary UV absorption measurement system, it is generally important to limit crosstalk between adjacent capillaries. This may be achieved by using a small illumination spot size in each capillary relative to the capillary's cross-sectional area. With a deuterium lamp UV source, this typically requires use of a pinhole mask (or other mask) and/or fiber optics to achieve a sufficiently compact system. However, much of the lamp's power is wasted in such systems and/or multiple lamps are needed to sufficiently illuminate multiple capillaries. Also, because deuterium lamps have a broad-spectrum output of incoherent radiation, it is generally not possible to focus a beam down to a dimension that is less than or equal to the capillary channel diameter.

Some preferred embodiments of the invention disclosed herein solve the above problems by utilizing a UV laser or other UV source characterized by high intensity or power, narrow wavelength band, and/or coherent emission. One embodiment uses a UV laser that is approximately 100 times brighter than a typical deuterium lamp and is able to provide beam that may be focused to a spot at which the beam diameter is less than or equal to the inner channel diameter of a capillary, yet with a small numerical aperture or divergence. Thus, the initial illumination power of the UV laser source is greater than in prior systems using deuterium lamps and has more favorable optical characteristic (e.g., small focus diameter and divergence). Also, because a UV laser source can produce a beam with a much smaller diameter and numerical aperture than does a deuterium UV lamp, a sufficiently small illumination spot size on each capillary can be achieved using focusing rather than having to rely on, for example, a pinhole mask or fiber optic array. Thus, much less of the source's illumination power is wasted and the sensitivity to variations in transmittance/absorption of a capillary sample is improved, since all or most of the beam energy is transmitted through the inner capillary channel. Thus, some embodiments of the invention implement optics that divide a single UV laser beam into multiple beamlets and that then direct and focus respective beamlets onto respective capillaries with a sufficiently small illumination spot size to avoid cross talk and with sufficient illumination power for obtaining usable transmittance or absorption measurements. In some embodiments, the multiple beamlets are optically coupled to or received by a fiber array having a plurality of optical fibers. In some embodiments, other UV sources with these favorable characteristics may be used instead of, or in addition to, a UV laser (e.g., a UV light emitting diode).

A challenge to using UV lasers in CE applications, rather than deuterium lamps, is that lasers typically have a much higher source noise level. However, in some embodiments disclosed herein, this problem is addressed using a reference capillary and a corresponding reference beam. Additionally, as will be further described below, detected electromagnetic radiation (e.g., UV radiation) from the reference beam may be used by a digital signal processing unit to reduce or remove noise from detected radiation of the other beams (corresponding to capillaries containing sample substances).

Tables 1-3 show optical characteristic of a UV laser having a Gaussian beam shape. Such beams may be used, for example, with capillaries having inner capillary channel diameters in the range of 50 micrometers to 200 micrometers to achieve the above discussed advantages.

TABLE 1

| Laser beam wavelength (nm) | 220 | 280 |
|---|---|---|
| Beam waist Diameter (um) | 10 | 10 |
| Numerical Aperture | 0.0140 | 0.0178 |
| Divergence (at z = zR; radians) | 0.0280 | 0.0357 |
| Divergence (at z = zR; degrees) | 1.60 | 2.04 |

TABLE 2

| Laser beam wavelength (nm) | 220 | 280 |
|---|---|---|
| Beam waist Diameter (um) | 20 | 20 |
| Numerical Aperture | 0.0070 | 0.0089 |
| Divergence (at z = zR; radians) | 0.0140 | 0.0178 |
| Divergence (at z = zR; degrees) | 0.80 | 1.02 |

TABLE 3

| Laser beam wavelength (nm) | 220 | 280 |
|---|---|---|
| Beam waist Diameter (um) | 40 | 40 |
| Numerical Aperture | 0.0035 | 0.0045 |
| Divergence (at z = zR; radians) | 0.0070 | 0.0089 |
| Divergence (at z = zR; degrees) | 0.40 | 0.51 |

In some embodiments, instrument 1000 further comprises optical fiber arrays 251 and 261. A fiber array comprises a plurality of optical fibers arranged in a particular manner. For example, a fiber array may include fibers arranged in a row or an approximate straight line. As another example, a fiber array may include fibers arranged in a bundle (e.g., fibers at least partially enclosed with a tube or a circular-shaped enclosure). An optical fiber can be made by, for example, glass or plastic. An optical fiber can receive appropriately directed light at one end, and guide it to another end of the optical fiber with minimum, negligible, or no loss of light. As illustrated in FIG. 2, optical fiber array 251 can be arranged to receive UV beamlets obtained from beam b1 of source 201 and/or beam b4 of source 204. Optical fiber array 251 delivers the received UV beamlets to pass through certain locations within the capillaries 101 for UV transmittance or absorption measurements. The UV beamlets that pass through capillaries 101, also referred to as the transmitted UV beamlets, are received by optical fiber array 261. Optical fiber array 261 delivers the received UV beamlets to a detector module 290. These beamlets are subsequently imaged onto a detector 291 in the detector module 290 for UV transmittance or absorption measurements.

Instrument 1000 further comprises optical detectors 291, 292, and 293 and digital signal processing unit 298. Instrument 1000 may be adapted to either incorporate or be communicatively coupled with a user device 280, which comprises a processor, memory, storage, display, and/or user interface components (e.g. a display, keyboard and/or touch screen, etc.) allowing a user to receive, use, and/or display data generated by instrument 1000 and, in some embodiments, control and/or configure aspects of instrument 1000. Digital signal processing (DSP) unit 298 processes signals from one or more of detectors 291-293 to, among other things, remove signal noise to help the instrument and user device obtain data usable for determining and displaying transmittance/absorption and/or fluorescence measurements corresponding to substances processed by the instrument. It should be noted that, in various embodiments, a DSP unit such as DSP unit 298 might be implemented in hardware, software, or a combination of hardware and software. Also, a DSP unit might be implemented on a connected user device and/or within a detection subsystem or other subsystem of the instrument itself.

Optical detectors 291, 292, and 293 may comprise one or more individual photodetectors including, but not limited to, photodiodes, photomultiplier tubes (PMTs), semiconductor detectors, multiple channel PMTs, or the like. Additionally, or alternatively, optical detectors 291, 292, and 293 may comprise an array sensor including an array of sensors or pixels. The array sensor may comprise one or more of a complementary metal-oxide-semiconductor (CMOS) sensor, a charge-coupled device (CCD) sensor, a plurality of photodiodes detectors, a plurality of photomultiplier tubes, or the like. In certain embodiments, one or more of optical detectors 291, 292, and 293 may comprise a spectrometer comprising an array detector and a dispersive element such as a reflection or transmission diffractive grating that spread incoming radiation into a spectrum across the detector array.

Sources 201-204, detectors 291-293, fiber arrays 251 and 261, and DSP unit 298 are part of an optical detection subsystem of instrument 1000. Other components of the optical detection system include various optical components arranged to provide various optical paths for beams travelling from sources 201-204 to detectors 291-293. Those optical components and optical paths are illustrated and described below in the context of FIGS. 2-6 and accompanying text, but are not separately shown in FIG. 1.

In summary, instrument 1000 operates as follows: A sample mixture or solution containing various samples or sample molecules is prepared in or delivered into a sample source container 105. At least a portion of the sample mixture is introduced into one end of capillaries 101, for example, at the cathode 103 using a pump or syringe (not separately shown) or by applying a charge or electric field to capillaries 101. With the sample solution loaded into the cathode end of a capillary 101, voltage supply 104 creates a voltage difference between cathode 103 and anode 102. The voltage difference causes negatively charged, dye-labeled samples to move from sample source container 105 to sample destination container 106. Longer and/or less charged dye-labeled samples move at a slower rate than do shorter and/or higher charged dye-labeled samples, thereby creating some separation between samples of varying lengths and/or charges. Beams originating from UV source 201, UV source 202, visible light source 203, and/or UV source 204 pass through a location within the capillaries 101. Beams used for UV transmittance or absorption measurements are delivered by fiber array 251, subsequently pass through capillaries 101, and are received by fiber array 261. The transmitted beams are subsequently imaged onto detector 291. Fluorescence resulting from a UV beam exciting substance in capillaries 101 is directed to detector 292. Fluorescence resulting from a visible light beam exciting substance in capillaries 101 is directed to detector 293. In certain embodiments, UV source 201 and/or UV source 204 may be replaced or supplemented by sources including other wavelength bands, for example, visible light, infrared, or near-infrared bands, for the purpose of making transmittance or absorption measurements within those wavelength bands.

Signals are provided from one or more of detectors 291-293 to DSP unit 298 for processing. Among other things, DSP unit 298 is configured to utilize signals corresponding to a reference capillary 101 to reduce noise in signals corresponding to other capillaries 101 through which samples to be measured pass. The output from DSP 298 is used by user device 280 or similar device to further process and display measurement results corresponding to measured samples.

FIG. 2 shows optical detection system 200 of instrument 1000 of FIG. 1 in accordance with an embodiment of the invention. The illustrated components provide multiple optical pathways from sources 201, 202, 203, and 204 to capillaries 101. In FIG. 2, a cross section of nine different capillaries 101 is shown. From the perspective of the illustrations in FIGS. 2, 3, and 6A, capillaries 101 extend longitudinally along a dimension orthogonal to the illustration (i.e., into and out of the page).

The relevant optical pathways and optical components illustrated in FIG. 2 will now be described in further detail, starting with the pathway from UV source 201 to detector 291.

Beam b1 and/or Beam b4: UV Absorption Measurement

As illustrated in FIG. 2, UV source 201 emits UV beam b1. Beam b1 passes through diffractive optical element 211, which operates to split beam b1 into nine beamlets that may be collimated or approximately collimated using a lens 212. Diffractive optical element 211 may be optionally configured to otherwise condition the beamlets, for example, configured to change the convergence or divergence of one or more of the beamlets from that of beam b1. In the illustrated embodiment, lens 212 further focuses one or more of the nine beamlets such that they can be aligned to the corresponding fibers of fiber array 251. In the illustrated embodiment, these beamlets are reflected by mirror 213 and received by fiber array 251.

In some embodiments, UV beams with two different wavelengths are used for UV absorption measurements. For example, as illustrated in FIG. 2, an additional UV source 204 emits UV beam b4. Beam b4 passes through diffractive optical element 233, which operates to split beam b4 into nine beamlets that may be collimated or approximately collimated using a lens 234. Diffractive optical element 233 may be optionally configured to otherwise condition the beamlets, for example, configured to change the convergence or divergence of one or more of the beamlets from that of beam b4. As described above, the beamlets originated from beam b1 are optionally reflected by mirror 213. The reflected beamlets originated from beam b1 pass through a dichroic beam combiner 235. The beamlets originated from beam b4 are also directed toward dichroic beam combiner 235. Dichroic beam combiner 235 combines beamlets originating from beam b1 of UV source 201, which operates at a first wavelength, and beamlets originating from beam b4 of UV source 204, which operates at a second wavelength. In some embodiments, lens 234 further focuses one or more of the nine beamlets originated from beam b4 such that they can be aligned to corresponding fibers of fiber array 251. The combined beamlets having two different wavelengths are then aligned with and received by the corresponding fibers of fiber array 251.

Fiber array 251 delivers the UV beamlets, originated from one or both beams b1 and b4, to capillaries 101. The UV beamlets then pass through capillaries 101. In the illustrated embodiment, eight of the capillaries contain samples to be measured and the ninth capillary is used as a reference. The UV beamlets from beam b1 and/or beam b4 passing through capillaries 101 are used to measure absorption and/or transmittance, wherein a portion of each beamlet's power is absorbed by a corresponding sample-filled capillary 101 and another portion transmits through the corresponding capillary 101. In certain embodiments, a smaller portion of a reference beamlet's power is absorbed by a reference capillary 101 than through some or all of the remaining capillaries.

Figure 3:
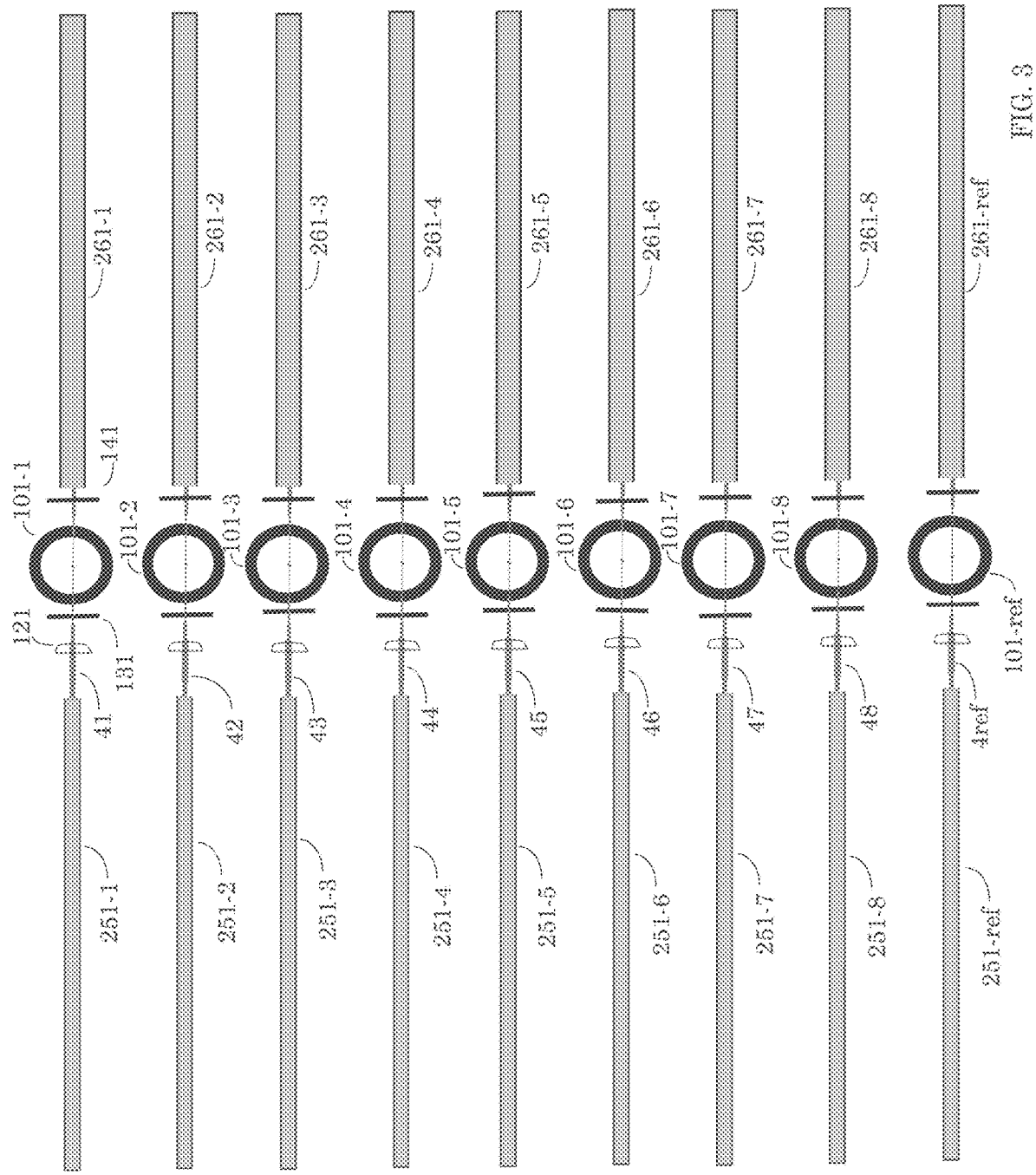
FIG. 3 illustrates certain additional details regarding optical elements for beamlets coupling in the optical detection system embodiment of FIG. 2.

FIG. 3 illustrates certain additional details regarding optical elements for beamlets coupling from fiber array 251 to capillaries 101 in the optical detection system 200 of FIG. 2. In some embodiments, a lenslet array and a plurality of UV beamlet masks are disposed between fiber array 251 and capillaries 101. As illustrated in FIG. 3, a lenslet 121 and a UV beamlet mask 131 are disposed between fiber 251-1 and capillary 101-1. As illustrated, respective other lenslets and UV beamlet masks are similarly disposed (but not separately numbered) between respective other fibers (251-2, 251-2, 251-3, 251-4, 251-5, 251-6, 251-7, and 251-8, and 251-ref) and capillaries (101-2, 101-3, 101-4, 101-5, 101-6, 101-7, 101-8, 101-ref).

As illustrated in FIGS. 2 and 3, fiber 251-1 directs a UV beamlet (e.g., a beamlet originated from beam b1 and/or beam b4) to lenslet 121. Lenslet 121 focuses the UV beamlet onto the core of capillary 101-1. In one embodiment, the UV beamlet is focused such that its diameter decreases from about 1 millimeter at lens 212/234 to approximately 10 microns at the capillary core. In other embodiments, other optical focusing powers can be used. The desired spot size or beam diameter at capillaries 101 (and hence the needed focusing power) will depend in part on the diameter of a capillary 101 used for a particular implementation. In certain embodiments, one or more optical elements, such as one or more lenslets or diffractive optical elements (not shown), may be placed between fibers of fiber array 251 and the respective capillaries 101 to individually control the focus of one or more corresponding UV beamlets. Focusing of a UV beamlet to have a smaller beam diameter concentrates the power of the UV beamlet to the core of a capillary 101. As a result, the accuracy of the UV absorption measurement is improved by reducing or eliminating cross talk between capillaries and by providing sufficient illumination power for obtaining usable transmittance or absorption measurements. The use of lenslet 121 therefore improves the signal-to-noise ratio for UV transmittance and absorption measurements.

As illustrated in FIG. 3, UV beamlet mask 131 is disposed between lenslet 121 and capillary 101-1. UV beamlet mask 131 can be, for example, a pinhole mask that reduces or eliminates UV lights or illuminations outside of the core of capillary 101-1. UV beamlet mask 131 can thus further reduce cross talk between capillaries, and thus further improves the signal-to-noise ratio for UV transmittance and absorption measurements. Other lenslets and UV beamlet masks can be disposed in a similar manner as shown in FIG. 3. The above description of UV beamlets coupling uses fiber 251-1, lenslet 121, mask 131 and capillary 101-1 as an example. It should be understood that other fibers, lenslets, masks, and capillaries can operate in a same or similar manner. FIG. 3 illustrates a short-working distance embodiment. In the illustrated embodiment, the lenslets have a short working distance and are disposed in close proximity (e.g., several microns to 1 mm) to the light outputting end of the respective fibers of fiber array 251 and to the respective UV beamlet masks and capillaries 101. In some short-working distance embodiments, fiber array 251, the short working-distance lenslet array, the UV beamlet masks, and the capillaries 101 are mounted relative to each other such that they are optically pre-aligned with one another. Further, in some embodiments of a short working-distance configuration as illustrated in FIG. 3, fiber arrays 251 and 261, the short working-distance lenslet array, the UV beamlet masks, and the capillaries 101 are integrated or packaged to a single replaceable assembly. When the capillaries need to be replaced, they are replaced by replacing the entire unit comprising the fiber arrays and the capillary array. Therefore, there is no need for the user to align the replaced capillary array with the fiber arrays because the fiber and capillary arrays are pre-aligned within the replacement unit.

In an alternative embodiment, illustrated in FIGS. 7A and 7B, pairs of prisms 702 are used to direct UV light for absorption measurements through each capillary in capillary array 704. This arrangement allows capillary array 704 to be arranged parallel (rather than perpendicular) to receiving fiber array 706 and illuminating fiber array 708. This can allow easier positioning of the capillary/fiber array unit inside the instrument. FIG. 7A illustrates a side view of this alternative and FIG. 7B shows a front view of a cross section of this alternative. FIG. 7B shows prism 702 and receiving fiber array 706 arranged above the capillary array 704 and prism 702 and illuminating fiber array 708 arranged below the capillary array 704. Those skilled in the art would appreciate that as shown in FIG. 7B, the receiving fiber array 706 includes a plurality of fibers, each of which is coupled with a respective prism 702. Similarly, the illuminating fiber array 708 includes a plurality of fibers, each of which is coupled with a respective prism 702. Also, each fiber in receiving fiber array 706 and each fiber in illuminating fiber array 708 are arranged with a corresponding capillary in capillary array 704.

Returning to the description of FIG. 3, fiber array 261 receives the UV beamlets that pass through capillaries 101. Fiber array 261 further delivers the received UV beamlets to detector module 290 (shown in FIG. 2). In some embodiments, such as the embodiment illustrated in FIG. 3, fibers in fiber array 261 preferably have larger diameters than those in fiber array 251. For example, fiber 261-1 has a larger core diameter than that of fiber 251-1. A larger diameter fiber in fiber array 261 improves collection efficiency associated with, for example, collecting UV beamlets that pass through capillaries 101 because of larger collection aperture. The delivering of the received UV beamlets and detection by a respective detector of detection module 290 are described in more detail below with respect to FIGS. 4 and 5.

In an alternative embodiment (not shown in FIG. 3), a long working-distance embodiment can be implemented. In such an embodiment, a fiber array (e.g., an illuminating fiber array similar to array 251 in FIG. 3) directs UV beamlets to a long working-distance lenslet array, rather than a short working-distance lenslet array. A long working-distance lenslet array has a longer working distance (e.g., millimeters to centimeters), and therefore a longer focusing distance, than a short working-distance lens. In the alternative embodiment, long working-distance lenslets focus respective UV beamlets onto the cores of respective capillaries. Similar to those described above in the context of FIG. 3, UV beamlet masks can be disposed between the long working-distance lenslets and respective capillaries to reduce or eliminate UV lights or illuminations outside of the cores of the respective capillaries.

Further, the alternative embodiment also includes a receiving lenslet array disposed between the capillaries and a receiving fiber array. The receiving lenslet array can also be a long work-distance lenslet array. The receiving lenslet array receives the UV beamlets that pass through capillaries. The receiving lenslet array further focuses the received UV beamlets to respective fibers of the receiving fiber array. The receiving fiber array further delivers the received UV beamlets to detector module 290 (shown in FIG. 2).

Unlike the short working-distance embodiment shown in FIG. 3, a long working-distance embodiment enables the detachment of the lenslet arrays from the capillaries. As a result, the capillaries and lenslet arrays can be separately packaged and replaced. In a long working-distance fiber array based system, the capillaries are aligned to the lenslet arrays by an actuator. The actuator can be controlled by, for example, user device 280. Further, because a long working-distance lenslet has a longer focusing distance than a short work-distance lenslet, a receiving long working-distance lenslet can better align and focus the UV beamlet received from a capillary to a corresponding receiving fiber. As a result, the receiving fibers are not required to have larger diameters than those in the illuminating fibers.

Beam b2: UV Fluorescence Measurement

With reference back to FIG. 2, UV source 202 emits UV beam b2. In the illustrated embodiment, as previously described, UV source 202 may operate at a different wavelength than does UV sources 201/204. As illustrated in FIG. 2, half wave plate 221 and polarizing beam splitter 222 are configured to split beam b2 into two beams: b2-R and b2-L. In one embodiment, beam b2 is split evenly into beams b2-R and b2-L. In other embodiments, the splitting ratio can be adjusted to implement a non-even split.

Beam b2-R is reflected by mirror 226 through half wave plate 253 and is then reflected by mirrors 227 and 228 before passing through dichroic mirror 247, and pinhole mask 238. Lens 248 then focuses the beam onto or near capillaries 101 and the beam propagates through capillaries 101 in a first direction (right to left from the standpoint of the illustrations of FIG. 2).

Beam b2-L passes through half wave plate 223, polarizing beam splitter 231, half wave plate 224, dichroic mirror 244, and pinhole mask 236. Lens 225 then focuses beam b2-L onto or near capillaries 101 and the beam propagates through capillaries 101 in a second direction, left to right from perspective of the illustration, opposite to that of the direction of b2-R. Splitting beam b2 into beam portions b2-L and b2-R and propagating each beam portion through the array of capillaries 101 in opposite direction allows more even excitation energy to be provided across the array of capillaries 101.

Fluorescence resulting from excitation of substances in each of the capillaries 101 by beams b2-L and b2-R is collected and collimated by fiber array 261 shown in FIG. 2. FIG. 3 illustrates certain details regarding optical elements for collecting fluorescence. In some embodiments, fluorescence masks are disposed between capillaries 101 and respective fibers of fiber array 261 to reduce or eliminate fluorescence emission cross talk between adjacent capillaries. For example, fluorescence mask 141 is disposed between capillary 101-1 and fiber 261-1 to reduce or eliminate fluorescence emission cross talk between capillaries 101-1 and 101-2. As illustrated, respective other fluorescence masks are similarly disposed (but not separately numbered) between respective other capillaries (101-2, 101-3, 101-4, 101-5, 101-6, 101-7, 101-8, 101-ref) and fibers (261-2, 261-2, 261-3, 261-4, 261-5, 261-6, 261-7, and 261-8, and 261-ref).

As illustrated in FIG. 3, using fluorescence mask 141 and/or the fluorescence mask disposed between capillary 101-2 and fiber 261-2, fluorescence emissions from capillary 101-1 can be reduced or blocked such that fiber 261-2 receives substantially reduced or no fluorescence emissions from capillary 101-1, and vice versa. The signal-to-noise ratio can therefore be improved. Fiber array 261 delivers the received fluorescence emissions to detector module 290 of FIG. 2. The delivering of the received fluorescence emissions and detection by a respective detector of detection module 290 are described in more detail below with respect to FIGS. 4 and 5. In some embodiments, fibers in fiber array 261 may have larger diameters than those in fiber array 251. For example, fiber 261-1 may have a larger core diameter than that of fiber 251-1. A larger diameter fiber in fiber array 261 improves collection efficiency associated with, for example, collecting UV fluorescence emissions because of larger collection aperture.

Beam b3: Visible Fluorescence

As illustrated in FIG. 2, visible light source 203 emits visible light beam b3. Half wave plate 241 and polarizing beam splitter 242 are configured to split beam b3 into two beams: b3-R and b3-L. In one embodiment, beam b3 is split evenly into beams b3-R and b3-L. In other embodiments, the splitting ratio can be adjusted to implement a non-even split.

Beam b3-R passes through half wave plate 245 and is reflected by mirror 246 and dichroic mirror 247. Dichroic mirror reflects beam b3-R through pinhole mask 238 to lens 248. Lens 248 then focuses the beam onto or near capillaries 101 and the beam propagates through capillaries 101 in a first direction (right to left from the standpoint of the illustrations of FIG. 2). Beam b3-L passes through half wave plate 243 and is reflected by dichroic mirror 244 through pinhole mask 236 to lens 225. Lens 225 then focuses the beam onto or near capillaries 101 and the beam propagates through capillaries 101 in a second direction, left to right from perspective of the illustration, opposite to that of the direction of b3-R. Splitting beam b3 into beam portions b3-L and b3-R and propagating each beam portion through the array of capillaries 101 in opposite direction allows excitation energy to be provided across the array of capillaries 101 more evenly.

Fluorescence resulting from excitation of substances in capillaries 101 by beams b3-L and b3-R is collected and collimated by fiber array 261 shown in FIG. 2. As described above, FIG. 3 illustrates certain details regarding collecting fluorescence. Collecting fluorescence as a result of excitation from beam b3 of visible light source 203 is the same or similar to that described above with respect to beam b2 of UV source 202, and thus is not separately described.

For fluorescent excitation beams originating from beams b2 (UV) and b3 (visible), pinholes (or beam masks) 236 and 238 can be used to block, respectively, the right-to-left propagating beams (b2-R and b3-R) and left-to-right propagating beams (b2-L and b3-L), as well as any back reflection from the capillary array resulting from those beams, from propagating back to sources 202 and 203. Blocking of the counter-propagating beams and back reflections by pinholes 236, 238 may be enhanced by use of an offset angle in the forward propagating beams.

Half wave plates 224, 253, 243, and 245 can be used to rotate polarization of beams b2-L (plate 224), b2-R (plate 253), b3-L (plate 243), and b3-R (plate 245). The polarization rotations imparted by plates 224 and 253 (on UV beams b2-L and b2-R) can be used to control Raman background emission intensity and/or to reduce laser beam back reflection. The polarization rotations imparted by plates 243 and 245 (on visible light beams b3-L and b3-R) can be used for background controlling and/or reducing laser beam back reflection.

Dichroic mirrors 244 and 247 couple UV and visible light beams used for exciting fluorescence of substances in capillaries 101. Specifically, dichroic mirror 244 coupled UV beam b2-L and visible light beam b3-L and dichroic mirror 247 couples UV beam b2-R and visible light beam b3-R.

Various Feature Combinations

The illustrated embodiment of optical detection system embodies various different combinations of features. These various combinations, alone or together, each form potentially distinct embodiments and the use of some combinations do not necessarily require use of the other combinations. For example:

In one aspect, optical detection system 200 provides optical pathways allowing two UV sources at different wavelengths to be used for absorption measurements. In another aspect, at least some of the optical components along the pathways corresponding to UV absorption measurements relying on each source are shared.

In another aspect, at least some optical components along a pathway for exciting fluorescence by a UV beam and along a pathway for exciting fluorescence by a visible light beam are shared and at least some components along pathways for collecting and measuring fluorescence of substances in capillaries excited by those beams are shared.

In a fully combined aspect, optical components are configured and arranged in optical detection system 200 to do the following: Measure UV absorption of substances in an array of capillaries using two UV sources operating a different wavelengths; excite and measure fluorescence of substances in the array of capillaries using one of the two UV sources; and excite and measure fluorescence of substances in the array of capillaries using a visible light source. In another aspect, one or more of the two UV sources and/or the visible light source are configured to provide a point source, for example, a laser and one or more optical element to produce a point source. In a related aspect, reference beams and a reference capillary are used to generate a reference signal for use in removing noise from measurement signals corresponding to the other capillaries.

Figure 4:
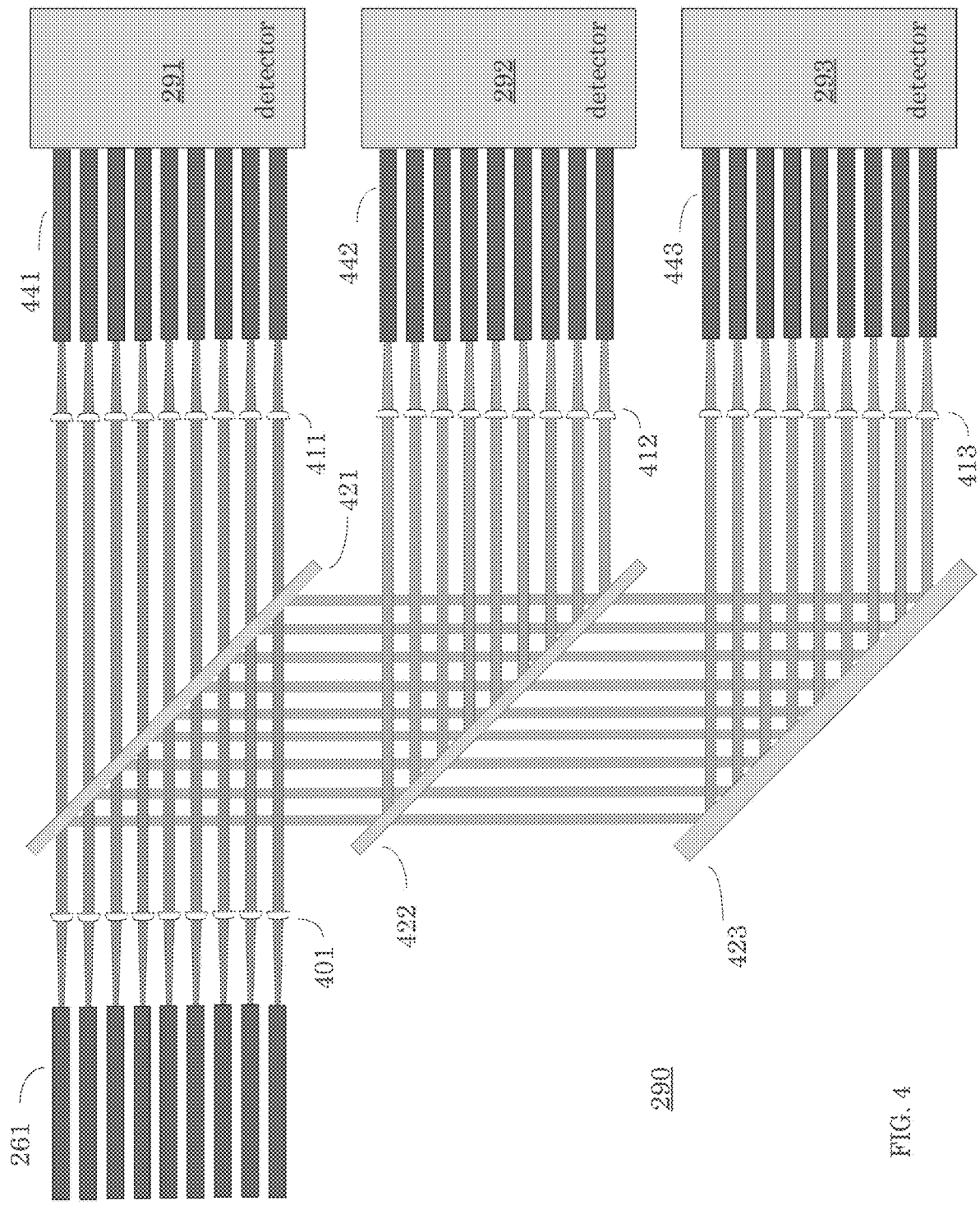
FIG. 4 illustrates certain additional details regarding optical elements for parallel light detection in the optical detection system embodiment of FIG. 2.

FIG. 4 illustrates certain additional details regarding optical elements for parallel light detection in the optical detection system 200 of FIG. 2. The parallel light detection can be based on wavelength decoupling. As described above, fiber array 261 delivers UV beamlets that pass through capillaries 101, fluorescence emission resulting from excitation by beam b2 of UV source 202, and/or fluorescence emission resulting from excitation by beam b3 of visible light source 203. These transmitted beamlets or emissions may be combined or mixed in fiber array 261 and delivered to detector module 290. In some embodiments, detector module 290 can include different detectors for detecting light signals having different wavelengths for different types of measurements. For example, as illustrated in FIG. 4, detector module 290 includes a detector 291 that detects image spots of transmitted UV beamlets (the UV beamlets that pass through capillaries 101). Detector module 290 further includes a detector 292 that detects image spots of fluorescence emission resulting from excitation by beam b2 of UV source 202. Detector module 290 further includes a detector 293 that detects image spots of fluorescence emission resulting from excitation by beam b3 of visible light source 203.

As illustrated in FIG. 4, optical detection system 200 can perform wavelength decoupling such that light signals having mixed wavelengths are imaged onto different detectors 291-293. For example, to perform wavelength decoupling, optical detection system 200 can include a lenslet array 401, dichroic mirrors 421 and 422, a reflection mirror 423, and lenslet arrays 411, 412, and 413. Fiber array 261 transmits light signals having mixed wavelengths to lenslet array 401. The lenslets in lenslet array 401 collimate the light signals received from fiber array 261. In the embodiment shown in FIG. 4, each lenslet in lenslet array 401 corresponds to a respective fiber in fiber array 261.

The collimated light signals then propagate through dichroic mirror 421, which is configured to separate light signals having a particular wavelength or wavelength band from the remaining light signals. For example, dichroic mirror 421 can separate, based on the wavelength differences, the UV beamlets that pass through capillaries 101 for transmittance/absorption measurements from the fluorescence emissions. Using dichroic mirror 421, the UV beamlets having certain wavelength or wavelength band can pass through dichroic mirror 421, but the fluorescence emissions having different wavelength or wavelength band are reflected. These UV beamlets that pass through dichroic mirror 421 then propagate further to fiber array 441 through lenslet array 411. Lenslet array 411 focuses, collimates, and aligns the UV beamlets to fiber array 441, which delivers the received UV beamlets to detector 291. Detector 291 detects the image spots of these UV beamlets for UV transmittance and absorption measurements.

As illustrated in FIG. 4, the fluorescence emissions reflected by dichroic mirror 421 propagate to dichroic mirror 422, which is configured to separate light signals having a particular wavelength or wavelength band from the remaining light signals. For example, dichroic mirror 422 can separate, based on the wavelength differences, the fluorescence emissions resulting from excitation by beam b2 of UV source 202, and fluorescence emissions resulting from excitation by beam b3 of visible light source 203. Using dichroic mirror 422, the fluorescence emissions resulting from excitation by beam b2 of UV source 202 are reflected by dichroic mirror 422, but the fluorescence emissions resulting from excitation by beam b3 of visible light source 203 pass through dichroic mirror 422. The UV fluorescence emissions that are reflected by dichroic mirror 422 then propagate further to fiber array 442 through lenslet array 412. Lenslet array 412 focuses, collimates, and aligns these UV fluorescence emissions to fiber array 442, which delivers the received UV fluorescence emissions to detector 292. Detector 292 detects the image spots of these fluorescence emissions resulting from excitation by beam b2 of UV source 202 for UV fluorescence measurements.

As described above, the fluorescence emissions that pass through dichroic mirror 422 can be fluorescence emissions resulting from excitation by beam b3 of visible light source 203. These fluorescence emissions can be reflected by mirror 423 and propagate further to fiber array 443 through lenslet array 413. Lenslet array 413 focuses, collimates, and aligns these fluorescence emissions to fiber array 443, which delivers the received fluorescence emissions to detector 293. Detector 293 detects the image spots of these fluorescence emissions resulting from excitation by beam b3 of visible light source 203 for visible light fluorescence measurements.

As illustrated in FIG. 4 and described above, using the dichromic mirrors and lenslet arrays, light signals with mixed wavelengths can be provided to respective detectors 291, 292, and 293 for performing different measurements (e.g., UV absorption, UV fluorescence, and visible fluorescence) simultaneously or at least partially in parallel. The ability to perform different measurements in parallel improves the measurement efficiency and speed.

FIGS. 5A-5C illustrate an alternative embodiment to the system portion illustrated in FIG. 4. The embodiment shown in FIGS. 5A-5C is arranged for detecting different light serially rather than in parallel. Under certain circumstances, different measurements are performed in serial and thus light signals delivered by fiber array 261 may be for only one measurement type at a time. For example, the measurements for UV absorption, UV fluorescence, and visible fluorescence may be performed separately or one after another. As a result, at any given time, the light signals delivered by fiber array 261 may have a single wavelength or wavelength band. Wavelength decoupling as described above with respect to FIG. 4 may thus not be required.

In the embodiment illustrated in FIGS. 5A-5C, fiber array 261 delivers light signals corresponding to a particular measurement type at a given time (UV absorption, UV fluorescence, or visible fluorescence). The light signals can include the UV transmitted (i.e., not absorbed) portion of beamlets from beams b1 and b4 that pass through capillaries 101, fluorescence emission resulting from excitation by beam b2 of UV source 202, or fluorescence emission resulting from excitation by beam b3 of visible light source 203. Fiber array 261 delivers the light signals to fiber array 541 through coupling lenslet arrays 501 and 511. Lenslet arrays 501 and 511 focus, collimate, and align light signals to fiber array 541. In some embodiments, fiber array 541 includes a plurality of sub-arrays, each of which is optically coupled to a different detector. For example, fiber array 541 may include a fiber sub-array 541-1 optically coupled to detector 291, a fiber sub-array 541-2 optically coupled to detector 292, and a fiber sub-array 541-3 optically coupled to detector 293. Fiber array 541 is sometimes referred to as a detector fiber array.

As illustrated in the side view of FIG. 5B, fiber array 541 can be mechanically attached to or mounted on a moveable stage (not shown). The moveable stage can be controlled (e.g., by user device 280 of FIG. 1) to align one sub-array of fiber array 541 with a respective detector 291, 292, or 293 and with coupling lenslet array 511. For example, if UV transmittance or absorption measurement is being performed, fiber array 261 delivers the UV beamlets that pass through capillaries 101. Moveable stage can be controlled to align fiber sub-array 541-1 to detector 291 and to the focal points of lenslet array 511. Similarly, if UV fluorescence measurement is being performed, fiber array 261 delivers fluorescence emission resulting from excitation by beam b2 of UV source 202. Moveable stage can then be controlled to align fiber sub-array 541-2 to detector 292 and to the focal points of lenslet array 511. And if visible light fluorescence measurement is being performed, fiber array 261 delivers fluorescence emission resulting from excitation by beam b3 of visible light source 203. Moveable stage can then be controlled to align fiber sub-array 541-3 to detector 293 and to the focal points of lenslet array 511.

FIG. 6A illustrates another embodiment of the optical detection system of the embodiment of FIG. 1. In some embodiments, the UV sources and visible light sources shown in FIG. 1 may be lamps, instead of lasers. As illustrated in FIG. 6A, additional optical elements can be used to couple light emitted from a lamp 601 to a fiber array 251. Lamp 601 emits UV light or visible light. In contrast to a laser beam, the light emitted from lamp 601 is in a divergent shape such that the power of the emitted light is dispersed in a much greater angle than that of a laser beam. The emitted light from lamp 601 propagates to an illumination coupler, which include lens 612 and lens 613. Lens 612 collects the emitted light from lamp 601 and lens 613 focuses the collected light onto fiber bundle 650.

In one embodiment, as illustrated in the cross-sectional views shown in FIGS. 6B and 6C, fiber bundle 650 include a plurality of fibers arranged differently at different ends. The plurality of fibers is arranged in a bundle (e.g., fibers at least partially enclosed with a tube or a circular-shaped enclosure) at a first end 650-in and arranged in a row or approximate straight line at a second end 650-out. First end 650-in receives light signals focused by lens 613. Therefore, a more densely packed fiber bundle at first end 650-in can have a higher optical coupling efficiency. Second end 650-out and fiber array 251 are similarly arranged in a row or an approximate straight line. As a result, fiber bundle 650 can be optically aligned to couple to fiber array 251 for delivering light signals to capillaries 101.

In some embodiments, lamp 601 may be a UV light source that emits light having more than one wavelength or wavelength bands. For example, lamp 601 may be a broadband UV light source that emits light having wavelengths corresponding to those of UV sources 201, 202, and 204 in FIG. 1. At any given time, a particular measurement (e.g., an UV transmittance or absorption measurement) may be performed and may thus require using a light source having a particular wavelength or wavelength band. In some embodiments, a filter wheel 614 can be disposed between the illumination coupler (including lens 612 and lens 613) and fiber bundle 650. Filter wheel 614 can be controlled (e.g., by user device 280) to select a proper filter to be disposed or inserted into the optical path between the illumination coupler and fiber bundle 650. For example, when performing an UV transmittance or absorption measurement, a first filter of filter wheel 614 can be selected to allow UV lights having a first wavelength or wavelength band to pass, while substantially blocking lights having other wavelengths. Similarly, a second or a third filter of filter wheel 614 can be selected for performing UV fluorescence or visible light fluorescence measurements, respectively.

Figure 8:
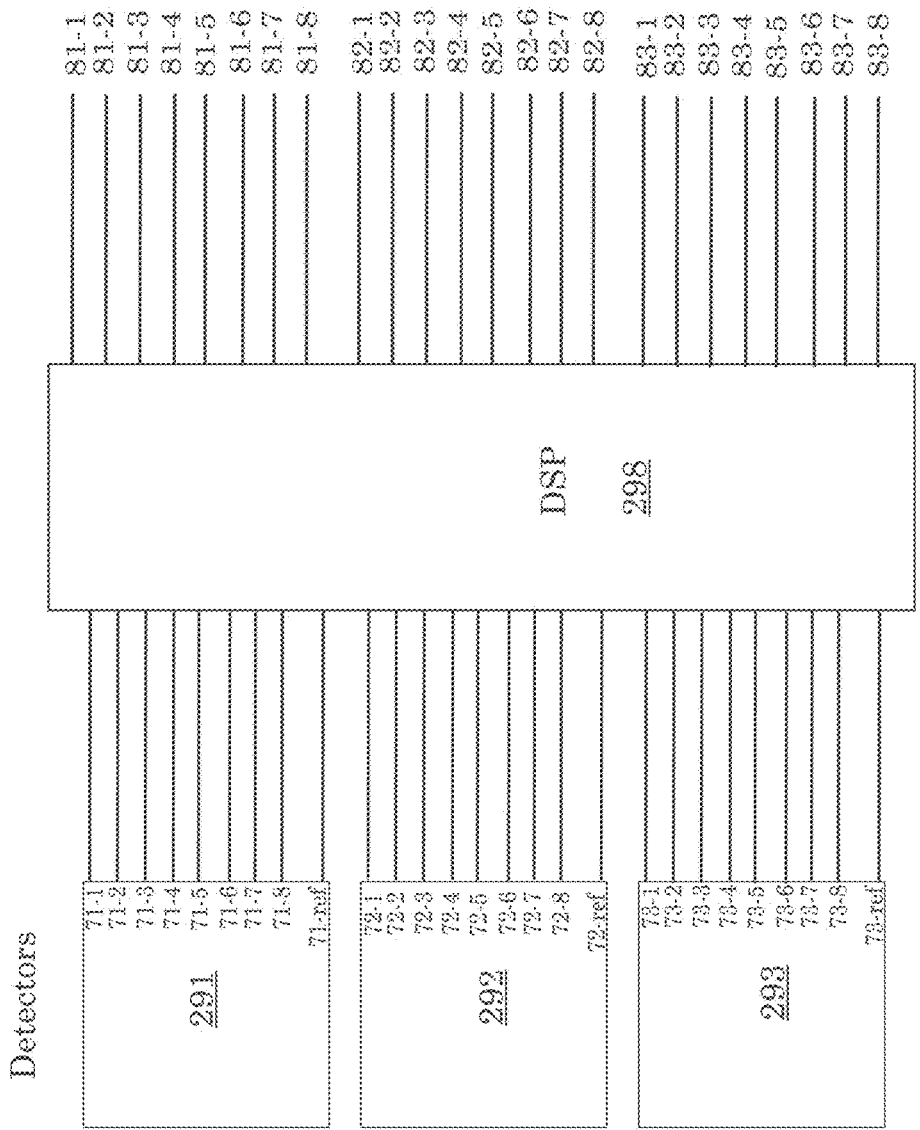
FIG. 8 illustrates signals from the detectors shown in FIGS. 1-6 and input to the digital signal processing unit shown in FIG. 1.

FIG. 8 is a block diagram illustrating signals output from detectors 291, 292, and 293 to DSP unit 298 and reduced noise signals output by DSP unit 298. As will be appreciated, the separate lines shown from the detectors to DSP unit 298 and shown as output from DSP unit 298 do not necessarily represent distinct hardware connections between (and outputs from) the illustrated elements. Rather, they simply represent distinct signal channels. In some embodiments, these separate signal channels might be implemented with physically separate connections; however, in other embodiments, they are implemented as separate signal channels conveyed over the same physical conduit.

Each detector outputs nine signals to DSP unit 298, i.e., one corresponding to each capillary measurement including measurement of eight capillaries comprising sample solutions and one reference capillary without any sample-filled solution. Detector 291 outputs to DSP unit 298 signals 71-1, 71-2, 71-3, 71-4, 71-5, 71-6, 71-7, 71-8, and 71-ref, corresponding to first wavelength UV absorption measurements of, respectively, capillaries 101-1, 101-2, 101-3, 101-4, 101-5, 101-6, 101-7, 101-8, and 101-ref. Signals 71-1 to 71-8 will include noise related to source 201 and/or source 204, noise related to sample solutions, and noise related to the respective capillaries. Signal 71-ref will contain the noise related to sources 201/204 and capillary 101-ref, but it will not contain noise related to samples. DPS unit 298 removes noise related to the sources 201/204 and the capillaries from signals 71-1 to 71-8 by comparing them to reference signal 71-ref using, for example, a cross correlation technique employing methods such as Weiner filtering, least squares filtering, and/or other techniques to obtain DSP output signals 81-1, 81-2, 81-3, 81-4, 81-5, 81-6, 81-7. and 81-8 which have substantially reduced source and capillary related noise relative to signals 71-1 to 71-8.

Detector 292 outputs to DSP 298 signals 72-1, 72-2, 72-3, 72-4, 72-5, 72-6, 72-7, 72-8, and 72-ref, corresponding to second wavelength UV absorption measurements of, respectively, capillaries 101-1, 101-2, 101-3, 101-4, 101-5, 101-6, 101-7, 101-8, and 101-ref. Signals 72-1 to 72-8 will include noise related to source 202, noise related to sample solutions, and noise related to the respective capillaries. Signal 72-ref will contain the noise related to source 202 and capillary 101-ref, but it will not contain noise related to samples. DPS unit 298 removes noise related to the source and the capillaries from signals 72-1 to 72-8 by comparing them to reference signal 72-ref using, for example, the previously described techniques for removing signal noise. DSP 298 outputs signals 82-1, 82-2, 82-3, 82-4, 82-5, 82-6, 82-7. and 82-8 which have substantially reduced source and capillary related noise relative to signals 72-1 to 72-8.

Detector 293 outputs to DSP 298 signals 73-1, 73-2, 73-3, 73-4, 73-5, 73-6, 73-7, 73-8, and 73-ref, corresponding to UV fluorescence measurements of, respectively, capillaries 101-1, 101-2, 101-3, 101-4, 101-5, 101-6, 101-7, 101-8, and 101-ref. Signals 73-1 to 73-8 will include noise related to source 203, noise related to sample solutions, and noise related to the respective capillaries. Signal 73-ref will contain the noise related to source 203 and capillary 101-ref, but it will not contain noise related to samples. DPS unit 298 removes noise related to the source and the capillaries from signals 73-1 to 73-8 by comparing them to reference signal 73-ref using, for example, the previously described techniques for removing signal noise. DSP 298 outputs signals 83-1, 83-2, 83-3, 83-4, 83-5, 83-6, 83-7. and 83-8 which have substantially reduced source and capillary related noise relative to signals 73-1 to 73-8.

DSP 298 can be implemented as processing logic in specifically configured hardware for example, in a Field Programmable Gate Array (FPGA) programmed for the relevant processing logic, in custom hardware, for example, in an Application Specific Integrated Circuit (ASIC), and/or in software executing on a special or general purpose processor (for example, on a processor of user device 280, or on a processor located elsewhere in instrument 1000).

While the present invention has been particularly described with respect to the illustrated embodiments, it will be appreciated that various alterations, modifications and adaptations may be made based on the present disclosure and are intended to be within the scope of the present invention.

Some examples of the many alternatives to the disclosed embodiments that could be implemented consistent with the spirit and scope of various aspects of the invention include, but are not limited, to the following: In some alternative embodiments, reflection rather than transmission optics (e.g., parabolic mirrors rather than lenses) can be used to direct the relevant beams onto the capillaries. In some embodiments, reflection rather than transmission optics could be used to direct the relevant beams onto the relevant detectors. In some embodiments, optical fibers could be used for the detection pathways (to direct light from the capillaries to the detectors) but not necessarily used for the illumination pathways (directing electromagnetic radiation from the source(s) to the capillaries).

In the illustrated embodiments, both transmittance/absorption measurements and fluorescent measurements are conducted based on illuminating the same window of a given capillary of the array. In other words, the same area of a capillary is targeted for illumination related to transmittance/absorption measurements and for illumination related to fluorescence measurements. However, in some alternative, separate windows could be used. For example, illumination for UV absorption measurements could occur at a first area of the capillary and illumination for fluorescence measurements could occur at a second area, longitudinally distant from the first area. In such embodiments, distinct optical paths would be implemented for each window and some of the separation optics of the embodiments illustrated in FIGS. 2-6 would not necessarily be needed.

These and other variations will be understood to be within the scope of the invention's potential embodiments.

While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the underlying principles of the invention as described by the various embodiments reference above and below.

Selected embodiments include:

1. An optical detection system for a capillary electrophoresis instrument comprising:
   an ultraviolet (UV) source; and
   an absorption measurement optical path comprising a first plurality of optical elements arranged to obtain a plurality of respective UV beamlets from a UV beam emitted by the UV source and to direct the respective UV beamlets through respective capillaries of a plurality of capillaries and to an absorption detector positioned to detect respective signals for use in obtaining respective UV absorption measurements corresponding to the respective capillaries.

2. The optical detection system of item 1 further comprising:
   a fluorescence excitation optical path comprising a second plurality of optical elements arranged to direct the UV beam though the plurality of capillaries and to direct respective fluorescence signals from the respective capillaries of the plurality of capillaries to a fluorescence detector positioned to detect the respective signals for use in obtaining respective fluorescence measurements corresponding to the respective capillaries.

3. The optical detection system of item 2 wherein the second plurality of optical elements comprises at least some of the first plurality of optical elements.

4. The optical detection system of item 2 wherein one or more optical elements of the first plurality of optical elements and the second plurality of optical elements are configurable to direct respective portions of the UV beam through the absorption measurement optical path and through the fluorescence measurement optical path substantially simultaneously.

5. The optical detection system of item 2 wherein one or more optical elements of the first plurality of optical elements and the second plurality of optical elements are configurable to reconfigure the optical detection system between a first mode and a second mode, the first mode characterized by a configuration of the system in which the UV beam is directed on the absorption measurement optical path and the second mode characterized by a configuration of the system in which the UV beam is directed on the fluorescence measurement optical path.

6. The optical detection system of item 1 wherein the UV source is a first UV source that operates at a first wavelength, the UV beam is a first UV beam, and the absorption measurement optical path is a first absorption measurement optical path, the optical detection system further comprising:
   a second UV source that operates at a second wavelength; and
   a second absorption measurement optical path comprising a third plurality of optical elements arranged to obtain a plurality of respective UV beamlets from a UV beam emitted by the second UV source and to direct the respective UV beamlets through respective capillaries of a plurality of capillaries and to an absorption detector positioned to detect respective signals for use in obtaining respective UV absorption measurements corresponding to the respective capillaries.

7. The optical detection system of any one of items 1-6 further comprising:
   a visible light source;
   a fluorescence excitation optical path comprising a third plurality of optical elements arranged to direct a fluorescence excitation light beam from the visible light source though the plurality of capillaries and to direct respective fluorescence signals from the respective capillaries of the plurality of capillaries to a visible light fluorescence detector positioned to detect the respective signals for use in obtaining respective fluorescence measurements corresponding to the respective capillaries.

8. The optical detection system of any one of items 1-5 wherein the UV source is a point source; or of item 6 wherein the UV source is a point source and the second UV source is a point source; or of item 7 wherein the UV source is a point course, the second UV source is a point source, and the visible light source is a point source.

9. The optical detection system of item 8 wherein one of the respective capillaries is designated as a reference capillary, the optical detection system further comprising:
   a digital signal processing unit configured to use signals corresponding to the reference capillary to remove UV source and capillary signal noise from signals corresponding to other capillaries of the respective capillaries wherein the other capillaries are designated to carry samples.

10. The optical detection system of item 1 wherein the first plurality of optical elements comprise a diffractive optical element used to obtain the respective UV beamlets from the UV beam.

11. An optical detection system for a capillary electrophoresis instrument comprising:

a first ultraviolet (UV) source that operates at a first wavelength;

a first absorption measurement optical path comprising a first plurality of optical elements arranged to obtain a plurality of first respective UV beamlets from a UV beam emitted by the first UV source and to direct the respective UV beamlets through respective capillaries of a plurality of capillaries and to an absorption detector positioned to detect respective signals for use in obtaining respective UV absorption measurements corresponding to the respective capillaries;

a second UV source that operates at a second wavelength; and a second absorption measurement optical path comprising a second plurality of optical elements arranged to obtain a plurality of second respective UV beamlets from a UV beam emitted by the second UV source and to direct the second respective UV beamlets through respective capillaries of the plurality of capillaries and to an absorption detector positioned to detect respective signals for use in obtaining respective UV absorption measurements corresponding to the respective capillaries.

12. The optical detection system of item 11 wherein the second plurality of optical elements comprises at least some of the first plurality of optical elements.

13. The optical detection system of item 11 further comprising:

a fluorescence excitation optical path comprising a third plurality of optical elements arranged to direct a UV beam originated from the first UV source though the plurality of capillaries and to direct respective fluorescence signals from the respective capillaries of the plurality of capillaries to a fluorescence detector positioned to detect the respective signals for use in obtaining respective fluorescence measurements corresponding to the respective capillaries.

14. The optical detection system of item 13 wherein the third plurality of optical elements comprises at least some of the first plurality of optical elements.

15. The optical detection system of any one of items 11-14 further comprising:

a visible light source;

a fluorescence excitation optical path comprising a fourth plurality of optical elements arranged to direct a fluorescence excitation light beam from the visible light source though the plurality of capillaries and to direct respective fluorescence signals from the respective capillaries of the plurality of capillaries to a visible light fluorescence detector positioned to detect the respective signals for use in obtaining respective fluorescence measurements corresponding to the respective capillaries.

16. The optical detection system of item 15 wherein the fourth plurality of optical elements comprises at least some of the third plurality of optical elements.

17. The optical detection system of any one of items 11-14 wherein the first UV source and the second UV source are point sources; or of any one of items 15-16 wherein the first UV source is a point source, the second UV source is a point source, and the visible light source is a point source.

18. The optical detection system of item 17 wherein one of the respective capillaries is designated as a reference capillary, the optical detection system further comprising:

a digital signal processing unit configured to use signals corresponding to the reference capillary to remove UV source and capillary signal noise from signals corresponding to other capillaries of the respective capillaries wherein the other capillaries are designated to carry samples.

19. The optical detection system of item 11 wherein the first plurality of optical elements comprises a diffractive optical element used to obtain the first respective UV beamlets from the first UV beam.

20. An optical detection system for a capillary electrophoresis instrument comprising:

an ultraviolet (UV) point source;

an absorption measurement optical path comprising a first plurality of optical elements arranged to obtain a plurality of respective UV beamlets from a UV beam emitted by the UV point source and to direct the respective UV beamlets through respective capillaries of a plurality of capillaries and to an absorption detector positioned to detect respective signals for use in obtaining respective UV absorption measurements corresponding to the respective capillaries.

21. The optical detection system of item 20 further comprising:

a fluorescence excitation optical path comprising a second plurality of optical elements arranged to direct the UV beam though the plurality of capillaries and to direct respective fluorescence signals from the respective capillaries of the plurality of capillaries to a fluorescence detector positioned to detect the respective signals for use in obtaining respective fluorescence measurements corresponding to the respective capillaries.

22. The optical detection system of item 21 wherein the second plurality of optical elements comprises at least some of the first plurality of optical elements.

23. The optical detection system of item 21 wherein one or more optical elements of the first plurality of optical elements and the second plurality of optical elements are configurable to direct respective portions of the UV beam through the absorption measurement optical path and through the fluorescence measurement optical path substantially simultaneously.

24. The optical detection system of item 21 wherein one or more optical elements of the first plurality of optical elements and the second plurality of optical elements are configurable to reconfigure the optical detection system between a first mode and a second mode, the first mode characterized by a configuration of the system in which the UV beam is directed on the absorption measurement optical path and the second mode characterized by a configuration of the system in which the UV beam is directed on the fluorescence measurement optical path.

25. The optical detection system of item 20 wherein the UV source is a first UV source that operates at a first wavelength, the UV beam is a first UV beam, and the absorption measurement optical path is a first absorption measurement optical path, the optical detection system further comprising:

a second UV source that is a point source and that operates at a second wavelength; and a second absorption measurement optical path comprising a third plurality of optical elements arranged to obtain a plurality of respective UV beamlets from a UV beam emitted by the second UV source and to direct the respective UV beamlets through respective capillaries of a plurality of capillaries and to an absorption detector positioned to detect respective signals for use in obtaining respective UV absorption measurements corresponding to the respective capillaries.

26. The optical detection system of any one of items 20-25 further comprising
a visible light point source;
a fluorescence excitation optical path comprising a second plurality of optical elements arranged to direct a fluorescence excitation light beam from the visible light point source though the plurality of capillaries and to direct respective fluorescence signals from the respective capillaries of the plurality of capillaries to a visible light fluorescence detector positioned to detect the respective signals for use in obtaining respective fluorescence measurements corresponding to the respective capillaries.

27. The optical detection system of any one of items 20-25 further comprising:
a digital signal processing unit configured to use signals corresponding to a reference capillary of the respective capillaries to remove UV source and capillary signal noise from signals corresponding to other capillaries of the respective capillaries wherein the other capillaries are designated to carry samples.

28. The optical detection system of any one of items 20-24, wherein the point source produces a beam having a beam diameter that is less than or equal to 5 micrometers, less than or equal to 10 micrometers, less than or equal to 20 micrometers, less than or equal to 50 micrometers, less than or equal to 100 micrometers, or less than or equal to 200 micrometers.

29. The optical detection system of item 20 wherein the first plurality of optical elements comprise a diffractive optical element used to obtain the respective UV beamlets from the UV beam.

30. An optical detection system for a capillary electrophoresis instrument comprising:
an ultraviolet (UV) source; and
an absorption measurement optical path comprising a first plurality of optical elements comprising a first optical fiber array and other elements, the first plurality of optical elements being arranged to:
obtain a plurality of respective UV beamlets from a UV beam emitted by the UV source, and
direct, at least partially using the first optical fiber array, the respective UV beamlets through respective capillaries of a plurality of capillaries and to an absorption detector positioned to detect respective signals for use in obtaining respective UV absorption measurements corresponding to the respective capillaries.

31. The optical detection system of item 30, wherein the first plurality of optical elements further comprises:
a lenslet array comprising respective lenslets, the respective lenslets being arranged to align the respective UV beamlets directed using the first optical fiber array to the cores of the respective capillaries of the plurality of capillaries; and
a plurality of respective UV beamlet masks disposed between the respective lenslets of the lenslet array and the respective capillaries of the plurality of capillaries, the respective UV beamlet masks being arranged to reduce UV light illuminations from the respective UV beamlets outside of the cores of the respective capillaries of the plurality of capillaries.

32. The optical detection system of item 30, wherein the UV source is a first UV source that operates at a first wavelength, the UV beam is a first UV beam, and the absorption measurement optical path is a first absorption measurement optical path, the optical detection system further comprising:
a second UV source that operates at a second wavelength; and
a second absorption measurement optical path comprising a second plurality of optical elements comprising the first optical fiber array and other elements, the second plurality of optical elements being arranged to:
obtain a plurality of respective second UV beamlets from a second UV beam emitted by the second UV source, and
direct, at least partially using the first optical fiber array, the respective second UV beamlets through the respective capillaries of the plurality of capillaries and to the absorption detector.

33. The optical detection system of item 30, wherein the UV source is a first UV source that operates at a first wavelength, the UV beam is a first UV beam, the optical detection system further comprising:
a third UV source; and
a UV fluorescence excitation optical path comprising a third plurality of optical elements arranged to direct a third UV beam emitted from the third UV source through the plurality of capillaries and to direct respective fluorescence signals from the respective capillaries of the plurality of capillaries to a UV fluorescence detector positioned to detect the respective signals for use in obtaining respective UV fluorescence measurements corresponding to the respective capillaries.

34. The optical detection system of item 33, wherein the first plurality of optical elements and the third plurality of optical elements are configurable to concurrently direct the first UV beam and the third UV beam through the absorption measurement optical path and through the UV fluorescence measurement optical path, respectively.

35. The optical detection system of item 33, further comprising:
a visible light source;
a visible fluorescence excitation optical path comprising a fourth plurality of optical elements arranged to direct a visible fluorescence excitation light beam emitted by the visible light source though the plurality of capillaries and to direct respective visible fluorescence signals from the respective capillaries of the plurality of capillaries to a visible light fluorescence detector positioned to detect the respective signals for use in obtaining respective visible fluorescence measurements corresponding to the respective capillaries.

36. The optical detection system of item 35, wherein the first plurality of optical elements, the third plurality of optical elements, and the fourth plurality of optical elements are configurable to concurrently direct the first UV beam, the third UV beam, and the visible fluorescence excitation light beam, respectively, through the absorption measurement optical path, through the UV fluorescence measurement optical path, and through the visible fluorescence excitation optical path, respectively.

37. The optical detection system of item 36, wherein the first plurality of optical elements, the third plurality of optical elements, and the fourth plurality of optical elements comprise a same second optical fiber array arranged to deliver one or more of:

the UV beamlets that pass through the plurality of capillaries;

UV fluorescence emission resulting from excitation by the third UV beam; and visible fluorescence emission resulting from the visible fluorescence excitation light beam.

38. The optical detection system of item 37, wherein the second optical fiber array is optically coupled to a plurality of wavelength decoupling elements arranged to direct, concurrently, at least two of:

the UV beamlets that pass through the plurality of capillaries to the absorption detector, the UV fluorescence emission resulting from excitation by the third UV beam to the fluorescence detector, and the visible fluorescence emission resulting from the visible fluorescence excitation light beam to the visible light fluorescence detector.

39. The optical detection system of item 37, wherein the second optical fiber array is optically coupled, separately in time, to one of:

a third optical fiber array arranged to direct the UV beamlets that pass through the plurality of capillaries to the absorption detector;

a fourth optical fiber array arranged to direct the UV fluorescence emission resulting from excitation by the third UV beam to the fluorescence detector, or a fifth optical fiber array arranged to direct the UV fluorescence emission resulting from excitation by the third UV beam to the fluorescence detector.

40. The optical detection system of item 30, wherein the UV source is a light source that emits lights having a plurality of wavelengths, further comprising a wavelength selecting element arranged to select a wavelength or wavelength range comprising a subset of the plurality of wavelengths.

41. The optical detection system of item 40 wherein the wavelength selecting element comprises a filter wheel.

The invention claimed is:

1. An optical detection system for a capillary electrophoresis instrument comprising:

an ultraviolet (UV) source; and an absorption measurement optical path comprising a first plurality of optical elements comprising a first optical fiber array and other elements, the first plurality of optical elements being arranged to:

obtain a plurality of respective UV beamlets from a UV beam emitted by the UV source, and direct, at least partially using the first optical fiber array, the respective UV beamlets through respective capillaries of a plurality of capillaries and to an absorption detector positioned to detect respective signals for use in obtaining respective UV absorption measurements corresponding to the respective capillaries;

wherein the UV source comprises a light source that emits lights having a plurality of wavelengths, further comprising a wavelength selecting element arranged to select a wavelength or wavelength range comprising a subset of the plurality of wavelengths.

2. The optical detection system of claim 1, wherein the first plurality of optical elements further comprises:

a lenslet array comprising respective lenslets, the respective lenslets being arranged to align the respective UV beamlets directed using the first optical fiber array to the cores of the respective capillaries of the plurality of capillaries; and a plurality of respective UV beamlet masks disposed between the respective lenslets of the lenslet array and the respective capillaries of the plurality of capillaries, the respective UV beamlet masks being arranged to reduce UV light illuminations from the respective UV beamlets outside of the cores of the respective capillaries of the plurality of capillaries.

3. The optical detection system of claim 1, wherein the UV source is a first UV source that operates at a first wavelength, the UV beam is a first UV beam, and the absorption measurement optical path is a first absorption measurement optical path, the optical detection system further comprising:

a second UV source that operates at a second wavelength; and a second absorption measurement optical path comprising a second plurality of optical elements comprising the first optical fiber array and other elements, the second plurality of optical elements being arranged to:

obtain a plurality of respective second UV beamlets from a second UV beam emitted by the second UV source, and direct, at least partially using the first optical fiber array, the respective second UV beamlets through the respective capillaries of the plurality of capillaries and to the absorption detector.

4. The optical detection system of claim 1, wherein the UV source is a first UV source that operates at a first wavelength, the UV beam is a first UV beam, the optical detection system further comprising:

a third UV source; and a UV fluorescence excitation optical path comprising a third plurality of optical elements arranged to direct a third UV beam emitted from the third UV source through the plurality of capillaries and to direct respective fluorescence signals from the respective capillaries of the plurality of capillaries to a UV fluorescence detector positioned to detect the respective signals for use in obtaining respective UV fluorescence measurements corresponding to the respective capillaries.

5. The optical detection system of claim 4, wherein the first plurality of optical elements and the third plurality of optical elements are configurable to concurrently direct the first UV beam and the third UV beam through the absorption measurement optical path and through the UV fluorescence measurement optical path, respectively.

6. The optical detection system of claim 4, further comprising:

a visible light source;

a visible fluorescence excitation optical path comprising a fourth plurality of optical elements arranged to direct a visible fluorescence excitation light beam emitted by the visible light source though the plurality of capillaries and to direct respective visible fluorescence signals from the respective capillaries of the plurality of capillaries to a visible light fluorescence detector positioned to detect the respective signals for use in obtaining respective visible fluorescence measurements corresponding to the respective capillaries.

7. The optical detection system of claim 6, wherein the first plurality of optical elements, the third plurality of optical elements, and the fourth plurality of optical elements are configurable to concurrently direct the first UV beam, the third UV beam, and the visible fluorescence excitation light beam, respectively, through the absorption measurement optical path, through the UV fluorescence measurement optical path, and through the visible fluorescence excitation optical path, respectively.

8. The optical detection system of claim 7, wherein the first plurality of optical elements, the third plurality of optical elements, and the fourth plurality of optical elements comprise a same second optical fiber array arranged to deliver one or more of:
the UV beamlets that pass through the plurality of capillaries;
UV fluorescence emission resulting from excitation by the third UV beam; and
visible fluorescence emission resulting from the visible fluorescence excitation light beam.

9. The optical detection system of claim 8, wherein the second optical fiber array is optically coupled to a plurality of wavelength decoupling elements arranged to direct, concurrently, at least two of:
the UV beamlets that pass through the plurality of capillaries to the absorption detector,
the UV fluorescence emission resulting from excitation by the third UV beam to the fluorescence detector, and
the visible fluorescence emission resulting from the visible fluorescence excitation light beam to the visible light fluorescence detector.

10. The optical detection system of claim 8, wherein the second optical fiber array is optically coupled, separately in time, to one of:
a third optical fiber array arranged to direct the UV beamlets that pass through the plurality of capillaries to the absorption detector;
a fourth optical fiber array arranged to direct the UV fluorescence emission resulting from excitation by the third UV beam to the fluorescence detector, or
a fifth optical fiber array arranged to direct the UV fluorescence emission resulting from excitation by the third UV beam to the fluorescence detector.

11. The optical detection system of claim 1, wherein the wavelength selecting element comprises a filter wheel.

12. An optical detection system for a capillary electrophoresis instrument comprising:
an ultraviolet (UV) source; and
an absorption measurement optical path comprising a first plurality of optical elements arranged to obtain a plurality of respective UV beamlets from a UV beam emitted by the UV source and to direct the respective UV beamlets through respective capillaries of a plurality of capillaries and to an absorption detector positioned to detect respective signals for use in obtaining respective UV absorption measurements corresponding to the respective capillaries;
wherein the first plurality of optical elements comprise a diffractive optical element used to obtain the respective UV beamlets from the UV beam.

13. The optical detection system of claim 12, further comprising:
a fluorescence excitation optical path comprising a second plurality of optical elements arranged to direct the UV beam though the plurality of capillaries and to direct respective fluorescence signals from the respective capillaries of the plurality of capillaries to a fluorescence detector positioned to detect the respective signals for use in obtaining respective fluorescence measurements corresponding to the respective capillaries.

14. The optical detection system of claim 13, wherein the second plurality of optical elements comprises at least some of the first plurality of optical elements.

15. The optical detection system of claim 13, wherein one or more optical elements of the first plurality of optical elements and the second plurality of optical elements are configurable to direct respective portions of the UV beam through the absorption measurement optical path and through the fluorescence measurement optical path substantially simultaneously.

16. The optical detection system of claim 13, wherein one or more optical elements of the first plurality of optical elements and the second plurality of optical elements are configurable to reconfigure the optical detection system between a first mode and a second mode, the first mode characterized by a configuration of the system in which the UV beam is directed on the absorption measurement optical path and the second mode characterized by a configuration of the system in which the UV beam is directed on the fluorescence measurement optical path.

17. The optical detection system of claim 12, wherein the UV source is a first UV source that operates at a first wavelength, the UV beam is a first UV beam, and the absorption measurement optical path is a first absorption measurement optical path, the optical detection system further comprising:
a second UV source that operates at a second wavelength; and
a second absorption measurement optical path comprising a second plurality of optical elements arranged to obtain a plurality of respective UV beamlets from a UV beam emitted by the second UV source and to direct the respective UV beamlets through respective capillaries of a plurality of capillaries and to an absorption detector positioned to detect respective signals for use in obtaining respective UV absorption measurements corresponding to the respective capillaries.

18. The optical detection system of claim 17, wherein one of the respective capillaries is designated as a reference capillary, the optical detection system further comprising:
a digital signal processing unit configured to use signals corresponding to the reference capillary to remove UV source and capillary signal noise from signals corresponding to other capillaries of the respective capillaries wherein the other capillaries are designated to carry samples.

19. The optical detection system of claim 17, further comprising:
a visible light source;
a fluorescence excitation optical path comprising a third plurality of optical elements arranged to direct a fluorescence excitation light beam from the visible light source though the plurality of capillaries and to direct respective fluorescence signals from the respective capillaries of the plurality of capillaries to a visible light fluorescence detector positioned to detect the respective signals for use in obtaining respective fluorescence measurements corresponding to the respective capillaries.

20. The optical detection system of claim 19, wherein each of the UV source, the second UV source, and the visible light source is a point source.

21. The optical detection system of claim 12, wherein the UV source is a point source.

* * * * *